United States Patent

[11] 3,629,082

[72] Inventors Valentin Alexeevich Kargin
ulitsa Gaidara, 7, kv. 4;
Elena Pavlovna Cherneva, ulitsa B.
Dorogomilovskaya, 58, korpus 1, kv. 21;
Tatyana Danilovna Ignatovich, Prospekt
Mira, 124, korpus 15, kv. 71; Nikolai
Nikolaevich Tunitsky, ulitsa Chaplygina,
1/12, kv. 8; Tatyana Nikolaevna
Toroptseva, 3 Mytischenskaya, 14-a, kv.
109, all of Moscow, U.S.S.R.
[21] Appl. No. 818,388
[22] Filed Apr. 22, 1969
[45] Patented Dec. 21, 1971

[54] PROCESS FOR PRODUCING HOMOGENEOUS POLYMERIC CATION-EXCHANGE MATERIALS
3 Claims, No Drawings

[52] U.S. Cl. .................................................... 204/159.14,
260/2.2
[51] Int. Cl. ................................................... C08f 15/02,
C08f 27/04, C08f 27/00
[50] Field of Search ............................................. 260/2.2;
204/159.14

[56] References Cited
UNITED STATES PATENTS
3,188,165   6/1965   Magat et al. ................... 8/115.5
FOREIGN PATENTS
185,052   7/1966   U.S.S.R. .......................
OTHER REFERENCES
Chapiro, Radiation Chemistry of Polymeric Systems, Interscience, N.Y. 1962. (pages 1– 13 supplied)
Swallow, Radiation Chemistry of Organic Compounds, Pergamon Press, New York 1960, pages 158, 160.
Bolt & Carroll, Radiation Effects on Organic Materials, Academic Press, New York 1963, pages 173– 175.
Helfferich, Ion Exchange, McGraw–Hill New York 1962, pages 103– 104.

Primary Examiner—Melvin Goldstein
Attorney—Waters, Roditi, Schwartz & Nissen

ABSTRACT: A process for producing homogeneous polymeric cation-exchange materials from a solution or a melt of a copolymer of 2.8 moles of sodium ethylenesulfonate and 2.4 moles of acrylic acid, followed by treatment with fast electrons at a dose rate of 0.2 to 0.7 Mrad per second for a period of 2 to 5 minutes.

3,629,082

PROCESS FOR PRODUCING HOMOGENEOUS POLYMERIC CATION-EXCHANGE MATERIALS

This invention relates to processes for the production of homogeneous polymeric cation-exchange materials in the form of films, electrodes, fibers and the like, which can be applied in medicine as hemostatic material, in chemical sources of current, in electrochemical converters and in general, in those fields of engineering where high electrolytic conductivity of materials is required.

Processes of producing homogeneous polymeric cation-exchange materials on the basis of copolymers of derivatives of ethylenesulfonic acid are known wherein said materials are formed from solutions or melts of said copolymers.

Thus a process is known for producing homogeneous polymeric cation-exchange membranes on the basis of copolymers of esters of ethylenesulfonic acid and divinylbenzene.

A disadvantage of said known processes is that they do not enable the production of the above polymeric materials with high electrochemical and mechanical properties.

Another disadvantage of the known processes is the necessity of working with esters of ethylenesulfonic acid which are toxic substances causing serious burns and dermititis when they come in contact with the skin, thus making difficult their industrial employment.

It is an object of the present invention to eliminate the above disadvantages.

It is a further and more specific object of the invention to provide a process for producing homogeneous polymeric cation-exchange materials with high electrolytic conductivity and mechanical strength, which process will not necessitate working with toxic materials.

These objects have been achieved by the provision of a process for producing homogeneous polymeric cation-exchange materials on the basis of copolymers of derivatives of ethylenesulfonic acid by forming said materials from solutions or melts of said copolymers, wherein, according to the invention, the copolymer of sodium ethylenesulfonate and acrylic acid is employed and after forming, the cation-exchange materials are subjected to the action of fast electrons.

As a result of the action of fast electrons said cation-exchange materials lose the ability to dissolve in water and organic solvents while retaining low resistivity ( ~ 10 ohm.cm. in the H+ form) and the ability to swell in water, making it possible to employ such swelling gels as additional active polyelectrolytic materials or conductive layers in chemical sources of current.

In order to increase the mechanical strength of the cation-exchange materials after they hive been subjected to the action of fast electrons, said materials should be treated with solutions of salts of heavy metals. This treatment brings about orientation of the macromolecules and an oriented structure of the polymeric materials. The tensile strength of said materials reaches 100–1000 kg./cm.$^2$, depending on the nature of the metal.

In order to obtain cation-exchange materials having high electrolytic conductivity and mechanical strength, said materials after being subjected to the action of fast electrons and after being treated with solutions of salts of heavy metals should be treated with solutions of mineral acids. As a result of this treatment the salt form of the cation-exchange materials is converted into the hydrogen form. After treatment with mineral acids the resistivity of said materials comes to 6–30 ohm.cm. and the tensile strength to 30–60 kg./cm.$^2$.

The process of producing homogeneous polymeric cation-exchange materials is effected as follows.

The initial monomers—sodium ethylenesulfonate and acrylic acid—are copolymerized by a radical method, e.g. in the presence of peroxides or by irradiation with ultraviolet light at room temperature.

The copolymer thus obtained is melted or dissolved in water, and polymeric cation-exchange materials are formed from the melt or solution at a temperature of 30°–40° C. in the form, say, of films, electrodes or fibers. Said materials are then subjected to the action of fast electrons at a dose rate of 0.2–0.7 Mrad. per sec., preferably 0.3 Mrad. per sec. for a period of 2–5 min.

To increase the mechanical strength of the cation-exchange materials obtained, said materials are additionally treated with solutions of salts of heavy metals, e.g. zirconium or thorium.

Saturated solutions of salts of heavy metals are preferably employed, since this precludes osmotic phenomena which occur when working with dilute solutions of said salts and which leads to rupture of the macromolecular chains and has an unfavorable effect on the structure of the cation-exchange materials.

In order to obtain cation-exchange materials possessing high electrolytic conductivity and mechanical strength said materials after being treated with solutions of salts of heavy metals should be treated, as disclosed above, with solutions of mineral acids. Concentrated solutions of mineral acids are used, preferably 6N hydrochloric acid. Said treatment with mineral acids can be carried out by the chemical or electrochemical method.

For a better understanding of the present invention the following examples of the production of homogeneous polymeric cation-exchange materials are given by way of illustration.

EXAMPLE 1

Sodium ethylenesulfonate and acrylic acid in the molar ratio of 2.8:2.4 are copolymerized by irradiation with ultraviolet light.

From a 1 percent aqueous solution of the copolymer a film 100 $\mu$ in thickness is produced by the casting method. This film is placed in a glass tray with a platinum electrode and subjected to the action of fast electrons in an integral dose of 100 Mrad. at a dose of 0.3 Mrad. per sec.

The film thus obtained has the ability of swelling in water (up to 900 percent) and can be utilized as a highly conductive additive ($\chi$=0.1 ohm$^{-1}$ cm.$^{-1}$) in chemical sources of current.

EXAMPLE 2

A polymeric film prepared as described in example 1 is treated with ZrO(NO$_3$)$_2$ by immersing it in a saturated aqueous solution of said salt (to accelerate the operation, the solution may be heated to 50°–70° C.). The film is then washed with distilled water.

The film thus obtained has the following physical and mechanical properties:

| | |
|---|---|
| Resistivity in Zr$^{+4}$ form, $\rho$ | 152 ohm. cm. |
| Tensile strength, $\sigma$ | 173 kg./cm.$^2$ |

EXAMPLE 3

A polymeric film prepared as described in examples 1 and 2 is treated with 6 N hydrochloric acid by the chemical method for 3 days or by the electrochemical method at a current strength of 2 ma/cm$^2$ for a period of 20–30 min. The salt form of the material is thereby converted into the hydrogen form. The film thus obtained has a resistivity $\rho$ of 7.0 ohm.cm. and a tensile strength $\sigma$ of 65 kg./cm$^2$.

EXAMPLE 4

A polymeric film prepared as described in example 1 is treated with a saturated solution of Th(NO$_3$)$_4$ by immersion in the solution at room temperature or at 50°–70° C.

The film obtained in the Th$^{+4}$ form has a resistivity $\rho$ of 116 Ohm.cm and a tensile strength $\sigma$ of 367kg./cm.$^2$.

EXAMPLE 5

A film prepared as in example 4 is treated with 3 N sulfuric acid by the chemical method for 3 days or by the electrochemical method at a current strength of 2 ma./cm.$^2$ for a period of 20–30 min.

The film obtained in the H$^+$ form has a resistivity $\rho$ of 20 ohm.cm a tensile strength $\sigma$ of 30 kg./cm.$^2$.

EXAMPLE 6

Fiber is formed from a 5 percent aqueous solution of the copolymer of sodium ethylenesulfonate and acrylic acid produced as in example 1. The fiber is subjected to the action of fast electrons as in example 1. The fiber is then treated with a saturated aqueous solution of Th(NO$_3$)$_4$ at room temperature or at 50°–70° C.

The fiber obtained has a breaking length of 30–50 km.

Though the present invention has been described in connection with a preferred embodiment, it will be understood that there may be changes and variations without departing from the spirit and scope thereof, as those skilled in the art will easily understand. All such changes and variations are to be considered as falling within the spirit and scope of the invention as defined in the appended claims.

We claim:

1. A process for producing homogeneous polymeric cation-exchange materials having a swelling capacity in water of 900 percent which comprises forming said materials from a solution of the copolymer of 2.8 moles of sodium ethylenesulfonate and 2.4 moles of acrylic acid or from a melt of said copolymer and subjecting said materials to the action of fast electrons at a dose rate of 0.2 to 0.7 Mrad. per second for a period of 2 to 5 minutes.

2. A process as defined in claim 1, wherein the cation-exchange materials are treated with a saturated solution of salts of thorium or zirconium after being subjected to the action of fast electrons.

3. A process as claimed in claim 2, wherein the cation-exchange materials are treated with a solution of a mineral acid after being treated with solutions of salts of thorium or zirconium.

* * * * *